United States Patent
Li

(10) Patent No.: US 11,609,955 B2
(45) Date of Patent: Mar. 21, 2023

(54) METHOD AND TERMINAL DEVICE FOR MANAGING APPLICATION SNIPPET

(71) Applicant: Huawei Technologies Co., Ltd., Shenzhen (CN)

(72) Inventor: Zijun Li, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 903 days.

(21) Appl. No.: 16/479,810

(22) PCT Filed: Apr. 21, 2017

(86) PCT No.: PCT/CN2017/081372
§ 371 (c)(1),
(2) Date: Jul. 22, 2019

(87) PCT Pub. No.: WO2018/133228
PCT Pub. Date: Jul. 26, 2018

(65) Prior Publication Data
US 2020/0175069 A1    Jun. 4, 2020

(30) Foreign Application Priority Data
Jan. 22, 2017 (CN) .......................... 201710054086.X

(51) Int. Cl.
*G06F 8/36* (2018.01)
*G06F 16/906* (2019.01)
(Continued)

(52) U.S. Cl.
CPC .............. *G06F 16/906* (2019.01); *G06F 8/36* (2013.01); *G06F 8/73* (2013.01); *G06F 8/77* (2013.01);
(Continued)

(58) Field of Classification Search
None
See application file for complete search history.

(56) References Cited

U.S. PATENT DOCUMENTS 9,614,920 B1 * 4/2017 Agarwal ................. H04L 67/53
10,698,930 B2 * 6/2020 Naqvi .................... G06F 16/951
(Continued)

FOREIGN PATENT DOCUMENTS

CN        101861566 A        10/2010
CN        103455330 A        12/2013
(Continued)

OTHER PUBLICATIONS

Yu, L., "Lucene Search Engine Development Authoritative Classic," Oct. 31, 2008, China Railway Press, 7 pages.
(Continued)

*Primary Examiner* — Marina Lee
(74) *Attorney, Agent, or Firm* — Conley Rose, P.C.

(57) ABSTRACT

A method for managing an application snippet includes: obtaining a first application snippet (S210); determining first classification information of the first application snippet (S220); determining that classification information of a first composite application on the terminal device matches the first classification information (S230); and adding the first application snippet to the first composite application (S240). According to the method for managing an application snippet, a large quantity of application snippets can be effectively managed.

20 Claims, 8 Drawing Sheets

(51) Int. Cl.
  *G06F 16/9038*  (2019.01)
  *G06F 8/73*  (2018.01)
  *G06F 8/77*  (2018.01)
  *H04L 67/00*  (2022.01)
  *G06F 9/445*  (2018.01)

(52) U.S. Cl.
  CPC ...... *G06F 9/44536* (2013.01); *G06F 16/9038* (2019.01); *H04L 67/34* (2013.01)

(56) References Cited

U.S. PATENT DOCUMENTS

| | | | |
|---|---|---|---|
| 2009/0089752 | A1 | 4/2009 | Tristram |
| 2010/0257508 | A1 | 10/2010 | Bajaj et al. |
| 2012/0272232 | A1* | 10/2012 | Song ........................ G06F 9/445 717/178 |
| 2013/0159892 | A1* | 6/2013 | Suraj ........................ G06F 8/34 715/762 |
| 2013/0174121 | A1* | 7/2013 | Pindrik ............... G06F 11/3612 717/120 |
| 2014/0095667 | A1 | 4/2014 | Quan et al. |
| 2016/0299972 | A1* | 10/2016 | Samdani ............... G06F 16/951 |

FOREIGN PATENT DOCUMENTS

| | | |
|---|---|---|
| CN | 105868226 A | 8/2016 |
| CN | 105955757 A | 9/2016 |
| CN | 106227400 A | 12/2016 |

OTHER PUBLICATIONS

Da Pu, "Development reference: JSTL Network Label and SSH Reference Manual," Nov. 30, 2010, China Railway Press, 6 pages.
Machine Translation and Abstract of Chinese Publication No. CN105955757, Sep. 21, 2016, 10 pages.
Machine Translation and Abstract of Chinese Publication No. CN105868226, Aug. 17, 2016, 16 pages.
Machine Translation and Abstract of Chinese Publication No. CN106227400, Dec. 14, 2016, 16 pages.
Foreign Communication From A Counterpart Application, PCT Application No. PCT/CN2017/081372, English Translation of International Search Report dated Oct. 26, 2017, 2 pages.
Foreign Communication From A Counterpart Application, PCT Application No. PCT/CN2017/081372, English Translation of Written Opinion dated Oct. 26, 2017, 6 pages.

* cited by examiner ional Application No. PCT/CN2017/081372, filed on Apr. 21, 2017, which claims priority to Chinese Patent Application No. 201710054086.X, filed on Jan. 22, 2017. Both of the aforementioned applications are hereby incorporated by reference in their entireties.

METHOD AND TERMINAL DEVICE FOR MANAGING APPLICATION SNIPPET

CROSS-REFERENCE TO RELATED APPLICATIONS

This application is a National Stage of International Application No. PCT/CN2017/081372, filed on Apr. 21, 2017, which claims priority to Chinese Patent Application No. 201710054086.X, filed on Jan. 22, 2017. Both of the aforementioned applications are hereby incorporated by reference in their entireties.

TECHNICAL FIELD

Embodiments of this application relate to the field of information technologies, and more specifically, to a method and a terminal device for managing an application snippet.

BACKGROUND

As a native (Native) application on an intelligent terminal becomes increasingly complex, the native application becomes increasingly large. Consequently, a larger volume of traffic is consumed for downloading the native application from a server (an application market) and more space is occupied for storing the native application on the intelligent terminal. More importantly, even though a user usually uses only some functions of the native application, the user needs to download and install the entire application, lowering entire usage efficiency of the application.

To resolve the foregoing problem, an improved technology, that is, a segmented native application, also referred to as a sliced or an instant application (Instant App), is provided. A technical key point is that a large native application is segmented into application snippets that can be independently executed, and the application snippets can be independently downloaded to an intelligent terminal for running. This resolves, to some extent, a problem that usage efficiency of an existing application is low, so that downloaded content highly matches content used by the user, thereby saving traffic and storage space, and time consumed from raising a requirement by the user to the application snippet becoming executable is shorter.

A native application is segmented into a plurality of application snippets, and an application snippet instead of an application is downloaded from an application market. That is, the application snippet may be independently searched for, downloaded, deployed, and run. The application is segmented into a plurality of application snippets, so that a quantity of application snippets is increased. Therefore, how to manage the application snippets on the intelligent terminal becomes a key problem.

There are a plurality of methods for managing the application snippets that are downloaded to the intelligent terminal. One method is to find an application snippet through native search on the intelligent terminal. This has a relatively high requirement on a keyword entered by the user. If different keywords are used during a plurality of searches, search results may be inconsistent. Another method is to arrange, at a unified access entrance, an application snippet block downloaded from the intelligent terminal. For example, a "historical record" records links of previously-downloaded application snippets. However, an increasing quantity of entries in the historical record makes it difficult to search. There is still another method. For example, no application snippet is stored on the intelligent terminal, and a new request is obtained from the server every time. A disadvantage of this method is that, the Internet needs to be accessed and traffic needs to be consumed every time, and it cannot be ensured that a same application snippet that is familiar to the user and favored by the user is requested for a plurality of times. A desktop icon management tool of the intelligent terminal provides a folder management function. That is, a folder is created, and icons representing applications are added to the folder, so that the applications are classified. In this way, the applications are managed hierarchically and a quantity of icons on the desktop is decreased effectively.

After the quantity of application snippets increases, how to manage these application snippets on the intelligent terminal, and especially, how to highly effectively find an application snippet, becomes a prominent problem that, cannot be well resolved using a current technology.

SUMMARY

Embodiments of this application provide a method and a terminal device for managing an application snippet, so that a large quantity of application snippets can be effectively managed. This helps a user reduce difficulty in using a same application snippet again, and is beneficial to improvement of distribution efficiency of the application snippet.

According to a first aspect, a method for managing an application snippet is provided. The method includes: obtaining a first application snippet; determining first classification information of the first application snippet; determining that classification information of a first composite application on the terminal device matches the first classification information; and adding the first application snippet to the first composite application.

In some possible implementations, the determining second classification information of the second application snippet includes: obtaining the second classification information through decomposition according to a constitutive rule of a release package of the second application snippet.

With reference to the first aspect, in a first possible implementation of the first aspect, before the obtaining a first application snippet, the method further includes: obtaining a second application snippet; determining second classification information of the second application snippet; determining that classification information of no composite application on the terminal device matches the second classification information; creating the first composite application, where the classification information of the first composite application matches the first classification information and the second classification information; and adding, by the terminal device, the second application snippet to the first composite application.

In some possible implementations, the determining second classification information of the second application snippet includes: obtaining the second classification information through decomposition according to a constitutive rule of a release package of the second application snippet.

With reference to the first aspect or the first possible implementation of the first aspect, in a second possible implementation of the first aspect, the first composite application includes a configuration file, where the adding the first application snippet to the first composite application includes: adding description information of the first application snippet to the configuration file of the first composite application, to establish an association relationship between the first application snippet and the first composite application, where the association relationship is an access navigation path from the first composite application to the first application snippet.

In some possible implementations, the adding the second application snippet to the first composite application includes: adding description information of the second application snippet to the configuration file of the first composite application, to establish an association relationship between the second application snippet and the first composite application, where the association relationship is an access navigation path from the first composite application to the second application snippet.

With reference to the second possible implementation of the first aspect, in a third possible implementation of the first aspect, the description information includes at least one of a name of the first application snippet, an executable code access path of the first application snippet, and an icon of the first application snippet.

With reference to any one of the first aspect or the first possible implementation to the third possible implementation of the first aspect, in a fourth possible implementation of the first aspect, before the determining first classification information of the first application snippet, the method further includes: determining that a user has executed the first application snippet.

With reference to any one of the first aspect or the first possible implementation to the fourth possible implementation of the first aspect, in a fifth possible implementation of the first aspect, the obtaining a first application snippet includes: obtaining the first application snippet sent by a server; or obtaining the first application snippet obtained by the user through native search.

In some possible implementations, the method further includes: displaying the first composite application in a display module.

According to the method for managing an application snippet in this embodiment of this application, a large quantity of application snippets can be effectively managed. This helps the user reduce difficulty in using a same application snippet again, and is beneficial to improvement of distribution efficiency of the application snippet.

According to a second aspect, a terminal device is provided. The terminal device includes a communications interface and a processor, where the communications interface is configured to obtain a first application snippet; the processor is configured to determine first classification information of the first application snippet; the processor is further configured to determine that classification information of a first composite application on the terminal device matches the first classification information; and the processor is further configured to add the first application snippet to the first composite application.

In some possible implementations, the processor is specifically configured to obtain the first classification information through decomposition according to a constitutive rule of a release package of the first application snippet.

With reference to the second aspect, in a first possible implementation of the second aspect, the communications interface is further configured to obtain a second application snippet; the processor is further configured to determine second classification information of the second application snippet; the processor is further configured to determine that classification information of no composite application on the terminal device matches the second classification information; the processor is further configured to create the first composite application, where the classification information of the first composite application matches the first classification information and the second classification information; and the processing module is further configured to add the second application snippet to the first composite application.

In some possible implementations, the processor is specifically configured to obtain the second classification information through decomposition according to a constitutive rule of a release package of the second application snippet.

With reference to the second aspect or the first possible implementation of the second aspect, in a second possible implementation of the second aspect, the first composite application includes a configuration file, where the processor is specifically configured to add description information of the first application snippet to the configuration file of the first composite application, to establish an association relationship between the first application snippet and the first composite application, where the association relationship is an access navigation path from the first composite application to the first application snippet.

With reference to the second possible implementation of the second aspect, in a third possible implementation of the second aspect, the description information includes at least one of a name of the first application snippet, an executable code access path of the first application snippet, and an icon of the first application snippet.

With reference to any one of the second aspect or the first possible implementation to the third possible implementation of the second aspect, in a fourth possible implementation of the second aspect, the processor is further configured to determine that a user has executed the first application snippet.

With reference to any one of the second aspect or the first possible implementation to the third possible implementation of the second aspect, in a fourth possible implementation of second aspect, the communications interface is specifically configured to: obtain the first application snippet sent by a server; or obtain the first application snippet obtained by the user through native search.

In some possible implementations, the terminal device further includes a display, configured to display the first composite application.

The terminal device in this embodiment of this application can effectively manage a large quantity of application snippets. This helps the user reduce difficulty in using a same application snippet again, and is beneficial to improvement of distribution efficiency of the application snippet.

According to a third aspect, a terminal device is provided. The terminal device includes a communications module and a processing module, where the communications module is configured to obtain a first application snippet; the processing module is configured to determine first classification information of the first application snippet; the processing module is further configured to determine that classification information of a first composite application on the terminal device matches the first classification information; and the processing module is further configured to add the first application snippet to the first composite application.

In some possible implementations, the processing module is specifically configured to obtain the first classification information through decomposition according to a constitutive rule of a release package of the first application snippet.

With reference to the third aspect, in a first possible implementation of the third aspect, the communications module is further configured to obtain a second application snippet; the processing module is further configured to determine second classification information of the second application snippet; the processing module is further configured to determine that classification information of no composite application on the terminal device matches the second classification information; the processing module is further configured to create the first composite application, where the classification information of the first composite application matches the first classification information and the second classification information; and the processing module is further configured to add the second application snippet to the first composite application.

In some possible implementations, the processing module is specifically configured to obtain the second classification information through decomposition according to a constitutive rule of a release package of the second application snippet.

With reference to the third aspect or the first possible implementation of the third aspect, in a second possible implementation of the third aspect, the first composite application includes a configuration file, and the processing module is specifically configured to add description information of the first application snippet to the configuration file of the first composite application, to establish an association relationship between the first application snippet and the first composite application, where the association relationship is an access navigation path from the first composite application to the first application snippet.

With reference to the third aspect or the second possible implementation of the third aspect, in a third possible implementation of the third aspect, the description information includes at least one of a name of the first application snippet, an executable code access path of the first application snippet, and an icon of the first application snippet.

With reference to any one of the third aspect or the first possible implementation to the third possible implementation of the third aspect, in a fourth possible implementation of the third aspect, the processing module is further configured to determine that a user has executed the first application snippet.

With reference to any one of the third aspect or the first possible implementation to the fourth possible implementation of the third aspect, in a fifth possible implementation of third aspect, the obtaining module is specifically configured to: obtain the first application snippet sent by a server; or obtain the first application snippet obtained by the user through native search.

In some possible implementations, the processing module includes a composite application management module. The composite application management module and a plurality of configuration files form a plurality of composite applications on the terminal device.

In some possible implementations, the terminal device further includes a display module, configured to display the first composite application.

The terminal device in this embodiment of this application can effectively manage a large quantity of application snippets. This helps the user reduce difficulty in using a same application snippet again, and is beneficial to improvement of distribution efficiency of the application snippet.

According to a fourth aspect, a computer-readable storage medium is provided. The computer-readable storage medium includes an instruction, where when the instruction is run on a computer, the computer is enabled to perform the method according to the foregoing aspects.

According to a fifth aspect, a computer program product is provided, where when the computer program product is run on a computer, the computer is enabled to perform the method according to the foregoing aspects.

DESCRIPTION OF EMBODIMENTS

The following describes technical solutions in embodiments of this application with reference to accompanying drawings.

Figure 1:
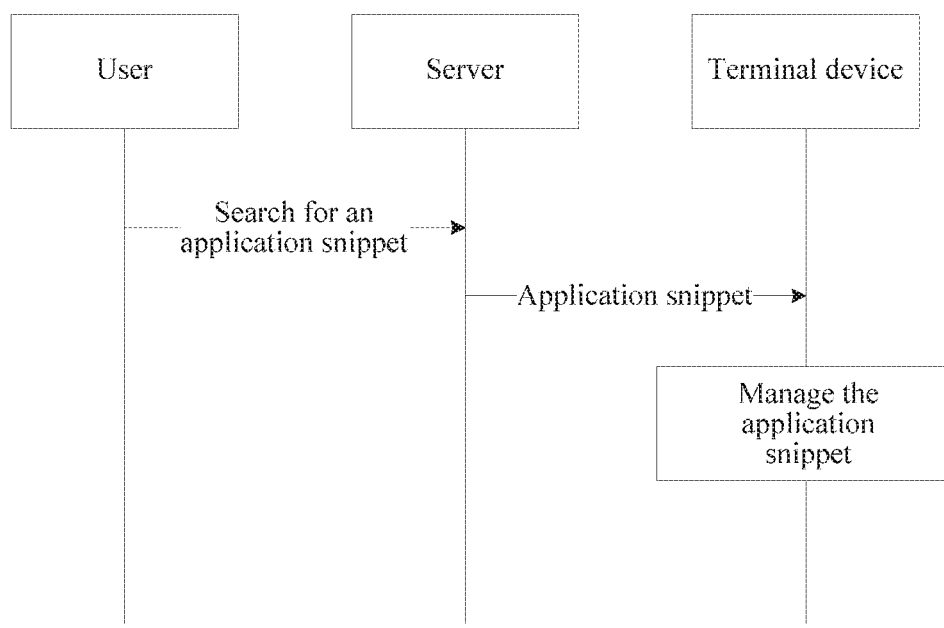
FIG. 1 shows an application scenario of a technical solution according to an embodiment of this application.

FIG. 1 is a schematic diagram of an application scenario of a technical solution according to an embodiment of this application. As shown in FIG. 1, a user sends a request of an applicable service function by using a terminal device, for example, sends a request by entering a text or a voice. The request carries a search keyword. Alternatively, a service requirement is triggered by clicking a link (URL). The link includes an application snippet identifier (or a service identifier), and the like, After receiving the search keyword or the application snippet identifier, a server searches for a matched application snippet, and returns the application snippet to the terminal device. The terminal device manages the received application snippet, so that when required again next time, the same application snippet can be found conveniently.

It should be understood that, in this embodiment of this application, the user may search for the application snippet by using the server, so that the terminal device manages the obtained application snippet. Alternatively, the user obtains the application snippet through native search on the terminal device, to manage the application snippet. Alternatively, the application snippet may be obtained in another manner. This application is not limited thereto.

The technical solution in this embodiment of this application may be applied to various terminal devices (also referred to as user equipment) that manage a received application snippet, for example, a mobile phone, a hand ring, a tablet computer, a notebook computer, an ultra-mobile personal computer (Ultra-Mobile Personal Computer, UMPC), a personal digital assistant (Personal Digital Assistant, PDA) device, a handheld device having a wireless communication function, a computing device, another processing device connected to a wireless modem, an in-vehicle device, and a wearable device, and are not limited to a communications terminal.

Figure 2:
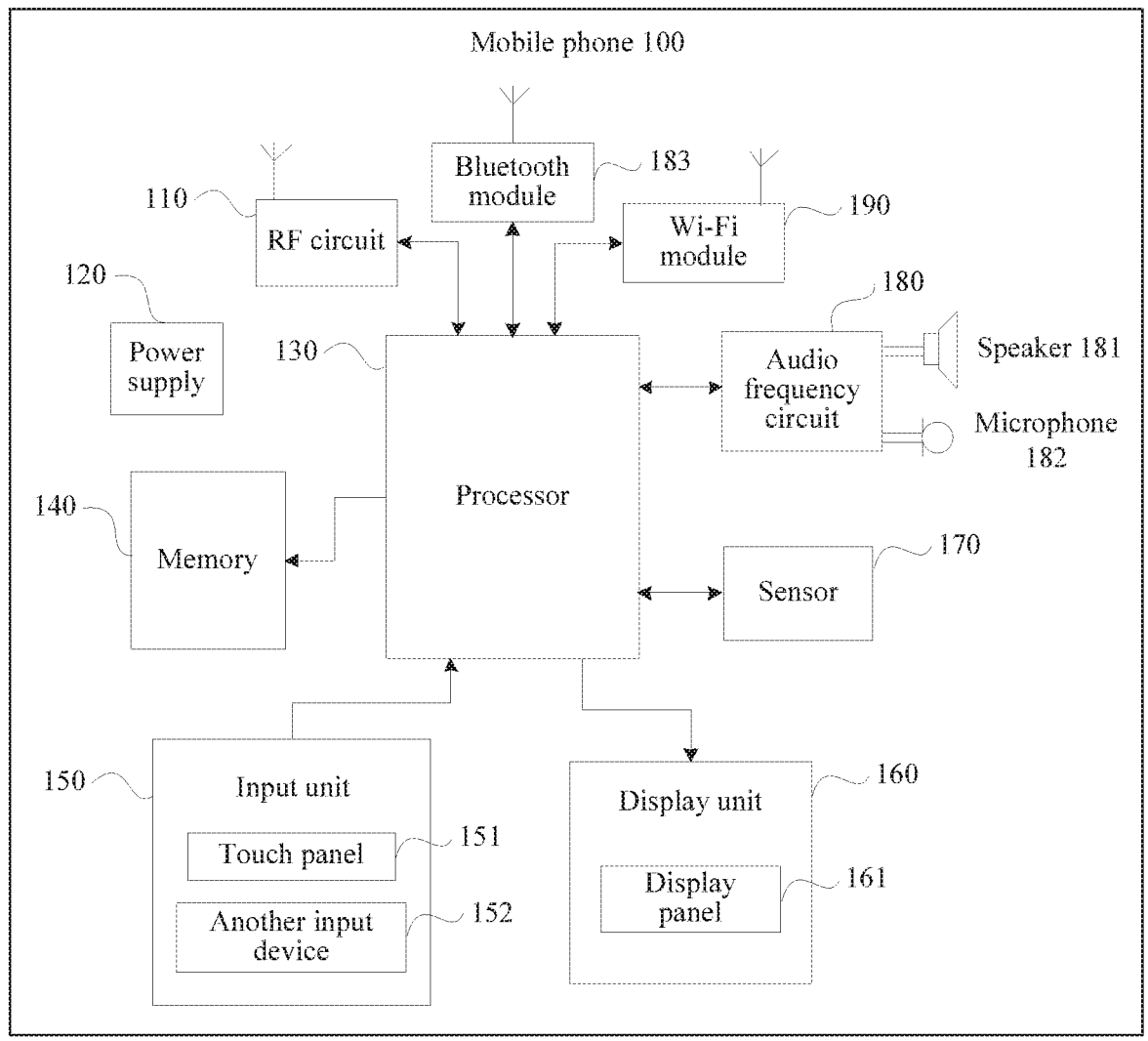
FIG. 2 is a schematic block diagram of a mobile phone according to an embodiment of this application.

First, a mobile phone 100 shown in FIG. 2 is used as an example to describe a terminal device applicable to an embodiment of this application. In this embodiment of this application, the mobile phone 100 may include components such as a radio frequency (Radio Frequency, RF) circuit 110, a power supply 120, a processor 130, a memory 140, an input unit 150, a display unit 160, a sensor 170, an audio frequency circuit 180, and a wireless fidelity (Wireless Fidelity, Wi-Fi) module 190. A person skilled in the art may understand that a structure of the mobile phone shown in FIG. 2 does not constitute a limitation on the mobile phone, and the mobile phone may include more or fewer components than those shown in the figure, or some components may be combined, or different component arrangements may be used.

The following specifically describes the components of the mobile phone 100 with reference to FIG. 2.

The RF circuit 110 may be configured to receive and send information or receive and send a signal during a call. Particularly, the RF circuit receives downlink information from a base station, then delivers the downlink information to the processor 130 for processing, and sends related uplink data to the base station. Usually, the RE circuit includes, but is not limited to, an antenna, at least one amplifier, a transceiver, a coupler, a low noise amplifier (Low Noise Amplifier, LNA), a duplexer, and the like. In addition, the RF circuit 110 may further communicate with a network and another device through wireless communication. The wireless communication may use any communication standard or protocol, including, but not limited to, Global System for Mobile communications (GSM), General Packet Radio Service (General Packet Radio Service, GPRS), Code Division Multiple Access (Code Division Multiple Access, CDMA), Wideband Code Division Multiple Access (Wideband Code Division Multiple Access, WCDMA), Long Term Evolution (Lon© Term Evolution, LTE), e-mail, Short Messaging Service (Short Messaging Service, SMS), and the like. In this application, the mobile phone 100 may obtain an application snippet by using the RF circuit 110, and sends the application snippet to the processor 130 for processing.

The memory 140 may be configured to store a software program and a module. The processor 130 executes various function applications of the mobile phone 100 and data processing by running the software program and the module that are stored in the memory 140. The memory 140 may include a program storage area and a data storage area. The program storage area may store an operating system, an application required by at least one function (such as a voice playback function and an image playback function), and the like. The data storage area may store data (such as audio data and a phonebook) that is created based on use of the mobile phone 100, and the like. In addition, the memory 140 may include a high speed random access memory, and may further include a non-volatile memory, such as at least one magnetic disk storage device, a flash memory, or another volatile solid-state storage device.

The input unit 150 may be configured to receive an entered digit or entered character information, and generate a key signal input related to user setting and function control of the mobile phone 100. In this application, the user sends, to the server by using the input unit 150, a request for searching for the application snippet, or searches for a local application slice of the mobile phone by using the input unit 150. Content that is entered may have various forms, for example, a keyword or a sentence. There may be a plurality of types of input media, for example, text, voice, and image. The input unit 150 may be implemented in various manners.

For example, a word can be entered on a touchpad, the microphone 182 can receive a voice input, and a camera can receive an image input. Specifically, the input unit 150 may include a touch panel 151 and another input device 152. The touch panel 151, also referred to as a touchscreen, may collect a touch operation of the user on or near the touch panel 151 (such as an operation of the user on the touch panel 151 or near the touch panel 151 by using any suitable object or accessory such as a finger or a stylus), and drive a corresponding connection apparatus based on a preset program. Optionally, the touch panel 151 may include two parts: a touch detection apparatus and a touch controller. The touch detection apparatus detects a touch position of the user, detects a signal generated by the touch operation, and transfers the signal to the touch controller. The touch controller receives touch information from the touch detection apparatus, converts the touch information into touch point coordinates, and sends the touch point coordinates to the processor 130. Moreover, the touch controller can receive and execute a command sent from the processor 130. In addition, the touch panel 151 may be implemented in a plurality of types, such as a resistive type, a capacitive type, an infrared type, and a surface acoustic wave type. The input unit 150 may include another input device 152 in addition to the touch panel 151. Specifically, the another input device 152, may include, but is not limited to, one or more of a physical keyboard, a functional key (such as a volume control key or a switch key), a trackball, a mouse, and a joystick.

The display unit 160 may be configured to display information entered by the user or information provided for the user, and various menus of the mobile phone 100. In this embodiment of this application, after the composite application is successfully created, a new icon is added to the display unit 160 of the mobile phone, and the composite application is displayed in the display unit 160. The display unit 160 may include a display panel 161. Optionally, the display panel 161 may be configured in a form of an LCD or OLED. Further, the touch panel 151 may cover the display panel 161. After detecting a touch operation on or near the touch panel 151, the touch panel 151 transfers the touch operation to the processor 130 to determine a touch event type. Subsequently, the processor 130 provides a corresponding visual output on the display panel 161 based on the touch event type. Although, in FIG. 2, the touch panel 151 and the display panel 151 are used as two separate parts to implement input and output functions of the mobile phone 100, in some embodiments, the touch panel 151 and the display panel 161 may be integrated to implement the input and output functions of the mobile phone 100.

The audio frequency circuit 180 and a speaker 181 may provide an audio interface between the user and the mobile phone 100. The audio frequency circuit 180 may convert received audio data into an electrical signal and transmit the electrical signal to the speaker 181, and the speaker 181 converts the electrical signal into a sound signal and outputs the sound signal. In addition, the microphone 182 converts a collected sound signal into an electrical signal, and the audio frequency circuit 180 receives the electrical signal and converts the electrical signal into audio data, and outputs the audio data to the RF circuit 110 to send the audio data to, for example, another mobile phone, or outputs the audio data to the memory 140 for further processing.

The Bluetooth module 183 is a printed circuit board (Printed Circuit Board Assembly, PCBA) having a Bluetooth function and used for short-distance wireless communication, and is classified into a Bluetooth data module and a Bluetooth voice module based on functions, and the mobile phone communicates with another user by using the Bluetooth module 183, and obtains the application snippet by using the Bluetooth module 183.

Wi-Fi belongs to a short-distance wireless transmission technology. By using the Wi-Fi module 190, the mobile phone 100 may help the user receive and send an email, browse a web page, access streaming media, and the like. The Wi-Fi module 190 provides wireless access to the broadband Internet for the user. Although FIG. 2 shows the Wi-Fi module 190, it may be understood that the Wi-Fi module 190 is not a mandatory constitute of the mobile phone 100, and may be totally omitted depending on requirements without changing the essence scope of this application. In this application, the mobile phone 100 may obtain the application snippet by using the Wi-Fi module 190, and send the application snippet to the processor 130 for processing.

The processor 130 is a control center of the mobile phone 100, is connected to various parts of the entire mobile phone by using various interfaces and lines, and performs various functions of the mobile phone 100 and data processing by running or executing the software program and/or the module stored in the memory 140 and invoking data stored in the memory 140, to implement various mobile-phone-based services. Optionally, the processor 130 may include one or more processing units. Preferably, the processor 130 may integrate an application processor and a modem processor, where the application processor may process the operating system, a user interface, an application, and the like, and the modem processor may process wireless communication. It may be understood that the foregoing modem processor may alternatively not be integrated into the processor 130. The processor 130 obtains an application snippet obtained through native search or an application snippet obtained from the server, the processor 130 determines classification information of the application snippet, and searches an existing composite application of the mobile phone for a composite application of a same type based on the classification information. If there is a composite application of a same type, the processor 130 adds the application snippet to the composite application; or if there is no composite application of a same type, the processor 130 generates a new composite application, and adds the application snippet to the newly-generated composite application, that is, establishes an association relationship between the application snippet and the composite application. The processor 130 further sends an instruction to the display unit 160, to instruct the display unit 160 to add a new icon to a desktop of the mobile phone to indicate the newly-generated composite application.

The mobile phone 100 may further include the power supply 120 (such as a battery) supplying power to the components. Preferably, the power supply may be logically connected to the processor 130 by using a power management system, to implement functions such as management of charging, discharging, and energy consumption by using the power management system.

Although not shown, a camera and the like may be further included in the mobile phone 100, and details are not described herein.

It should be noted that, the mobile phone shown in FIG. 2 is merely an example of the terminal device, and the terminal device is not specially limited in this embodiment of this application. This embodiment of this application may be applied to an electronic device such as a mobile phone and a tablet computer. This is not limited in this embodiment of this application.

Figure 3:
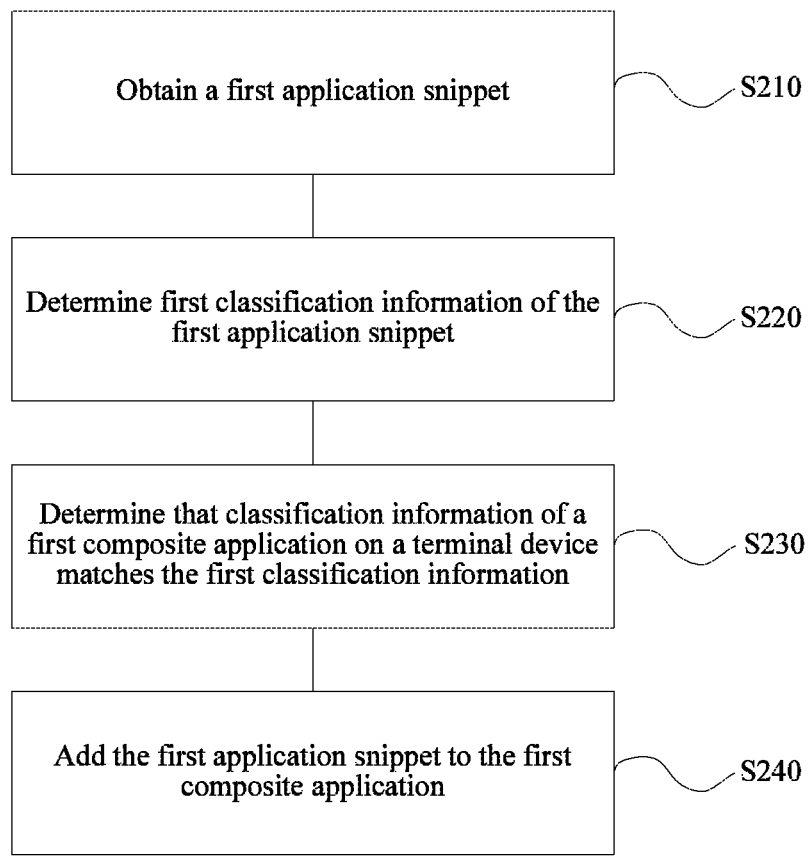
FIG. 3 is a schematic flowchart of a method for managing an application snippet according to an embodiment of this application.

FIG. 3 is a schematic flowchart of a method 200 for managing an application snippet according to an embodiment of this application. As shown in FIG. 2, the method 200 may be performed by a terminal device (for example, the mobile phone 100), and the method 200 includes the following steps.

S210, Obtain a first application snippet.

Specifically, a user may obtain the first application snippet from a server or through native search on the terminal device. For example, the user may search for the first application snippet by sending a search instruction to the server in two manners: entering text by using the input unit 150 of the mobile phone 100 or entering a voice to the server by using the microphone 182, or obtain the first application snippet through native search on the mobile phone 100. The entered text or voice includes classification information of the first application snippet (for example, a service identifier of the first application snippet). A communications interface of the mobile phone 100 receives the obtained first application snippet.

It should be understood that, the communications interface of the mobile phone 100 may be the RF circuit 110 in the mobile phone 100, the Wi-Fi module 190 in the mobile phone 100, or the Bluetooth module 183. This application is not limited thereto.

The application snippet may include the following parts:

(1) Entrance: The user executes the application snippet through the entrance. For example, an icon is an entrance, and the user clicks the icon to execute a program corresponding to the icon.

(2) Program: The program is a body of the application snippet and is capable of implementing service logic of the application snippet.

Figure 4:
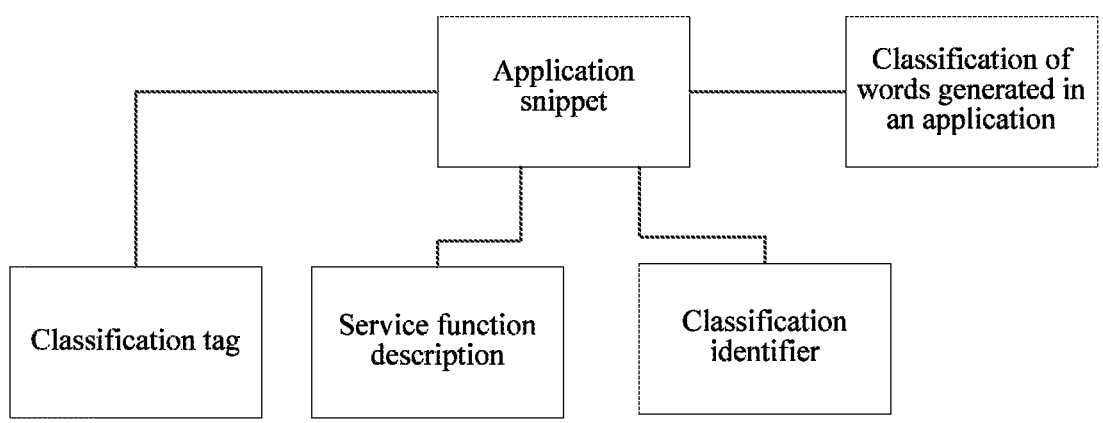
FIG. 4 is a schematic diagram showing an application snippet associated with a function attribute according to an embodiment of this application.

(3) Classification: The classification describes function classifications of the application snippet. The attribute of classification may be expressed in a plurality of forms. FIG. 4 is a schematic diagram of an association between an application snippet and a function attribute. The application snippet has three types of attributes for describing functions that are all used to describe the function classifications of the application snippet. A classification tag is usually a word in a text form. A service function description is usually a text paragraph. A classification identifier is usually a key-value (Key-Value) pair used to clearly describe a classification of the application snippet. A classification source may further be content (for example, a title word or prompt information) of the application snippet. The content is analyzed and classification information of the application snippet is formed. The application snippet that is obtained by the terminal device from the server or the terminal device carries the foregoing function classification information.

It should be understood that, the foregoing function classification information of the application snippet is usually stored in a configuration file published along with the application snippet. This application is not limited thereto.

S220. Determine first classification information of the first application snippet.

Specifically, after obtaining the first application snippet, the terminal device processes the first application snippet, to determine first classification information in the first application snippet. The first classification information may be at least one of the classification tag, the service function description, and the classification identifier in the foregoing function classification information.

For example, the terminal device is the mobile phone 100. The mobile phone 100 obtains the first application snippet by using the RF circuit 110, the Wi-Fi module 190, or the Bluetooth module 183. The RF circuit 110, the Wi-Fi module 190, or the Bluetooth module 183 may send the obtained first application snippet to the processor 130 for processing. After receiving the first application snippet, the processor 130 determines the classification information of the first application snippet.

S230. Determine that classification information of a first composite application on the terminal device matches the first classification information.

Specifically, the terminal device may have a plurality of composite applications, and each composite application has respective classification information. The terminal device may perform matching between classification information of the plurality of composite applications and the first classification information, to determine that classification information of a first composite application in the plurality of composite applications matches the first classification information.

For example, the terminal device is the mobile phone 100. After processing the first classification information, the processor 130 of the mobile phone 100 may further determine the classification information of the plurality of composite applications in the mobile phone 100, and the processor 130 performs matching between the classification information of the plurality of composite applications and the first classification information, to determine that classification information of a specific composite application in the plurality of composite applications matches the first classification information.

The following describes the composite application. The composite application may include the following four parts:

(1) Entrance: The user executes the composite application through the entrance. For example, a desktop icon of the terminal device is a typical entrance.

(2) Container: The container is configured to manage an application module in the composite application. The user executes the composite application through the entrance, that is, first enters the container. The container displays an application snippet included in the composite application. If there is no application snippet in the composite application, the container is empty. It should be understood that, a rectangular frame displayed on the desktop of the intelligent terminal is a typical container.

(3) Application snippet: content included in the container. When the application snippet is added to a composite application, an association relationship is established between the application snippet and the container of the composite application. When the container is displayed, the application snippet included in the container is displayed. The user can execute the application snippet through the entrance of the application snippet.

(4) Classification: The classification is used to describe classification information of the composite application. Usually; a tag or an "attribute-value" pair is a common method for describing classification information. For example, "food ordering", "film ticket", "car ordering", "group buying", or the like can be used as a classification.

The composite application has no service logic, and therefore functions of a plurality of composite applications can be implemented by using a composite application management module plus a plurality of configuration files. Each composite application resolves three problems: how to navigate a container by using an entrance icon, how to display the icon of the application snippet by using the container, and how to execute the application snippet by using the icon of the application snippet. Certainly, the composite application can provide a basic public capacity to the application snippet included in the composite application, for example, a user management capability and a payment management capability.

Figure 5:
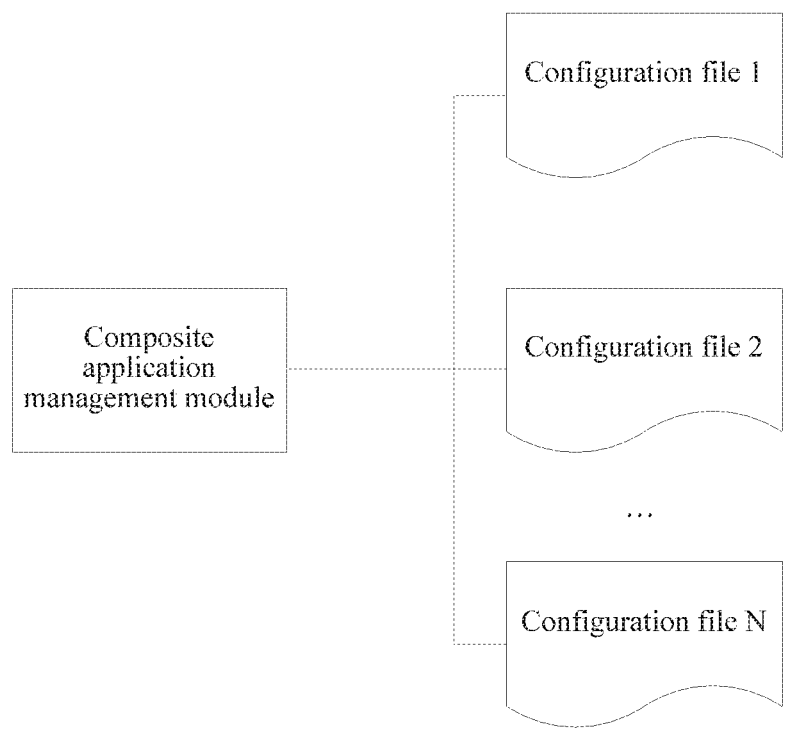
FIG. 5 is a schematic diagram of a composite application according to an embodiment of this application.

FIG. 5 is a schematic diagram of a composite application. As shown in FIG. 5, one composite application may include one configuration file. A configuration file of a newly-created composite application does not include information related to an application snippet. Table 1 is an example of a configuration file. A data correspondence in the table can be expressed in a plurality of forms including Extensible Markup Language (Extensible Markup Language, XML):

TABLE 1

| Attribute | Value | Description |
|---|---|---|
| Composite application name | Local life | |
| Composite application classification | Discount, local, shopping, and group buying | A classification may be one or more tags |
| Composite application icon | A.jpg | An image of a jpg format is used as an example |
| Application snippet 1 name | Film ticket | |
| Application snippet 1 file | B1.apk | An Android package is used as an example |
| Application snippet 1 icon | B1.jpg | |
| Application snippet 2 name | Food ordering | |
| Application snippet 2 file | B2.apk | |
| Application snippet 2 icon | B2.jpg | |
| . . . | | |

S240. Add the first application snippet to the first composite application.

Specifically, after determining that the first classification information matches the classification information of the first composite application, the terminal device may add the first application snippet to the first composite application.

Optionally, the adding the first application snippet to the first composite application includes: adding description information of the first application snippet to a configuration file of the first composite application, where the description information includes at least one of a name of the first application snippet, an executable code access path of the first application snippet, and art icon of the first application snippet.

It should be understood that, an association relationship between the first application snippet and the first composite application is established when the first application snippet is added to the first composite application, where the association relationship is an access navigation path from the first composite application to the first application snippet.

It should further be understood that, an application snippet file can be located through the executable code access path of the application snippet, so that the application snippet cart be executed by using the composite application as an entrance.

According to the method for managing an application snippet in this embodiment of this application, a large quantity of application snippets can be effectively managed. This helps a user reduce difficulty in using a same application snippet again, and is beneficial to improvement of distribution efficiency of the application snippet.

Figure 6:
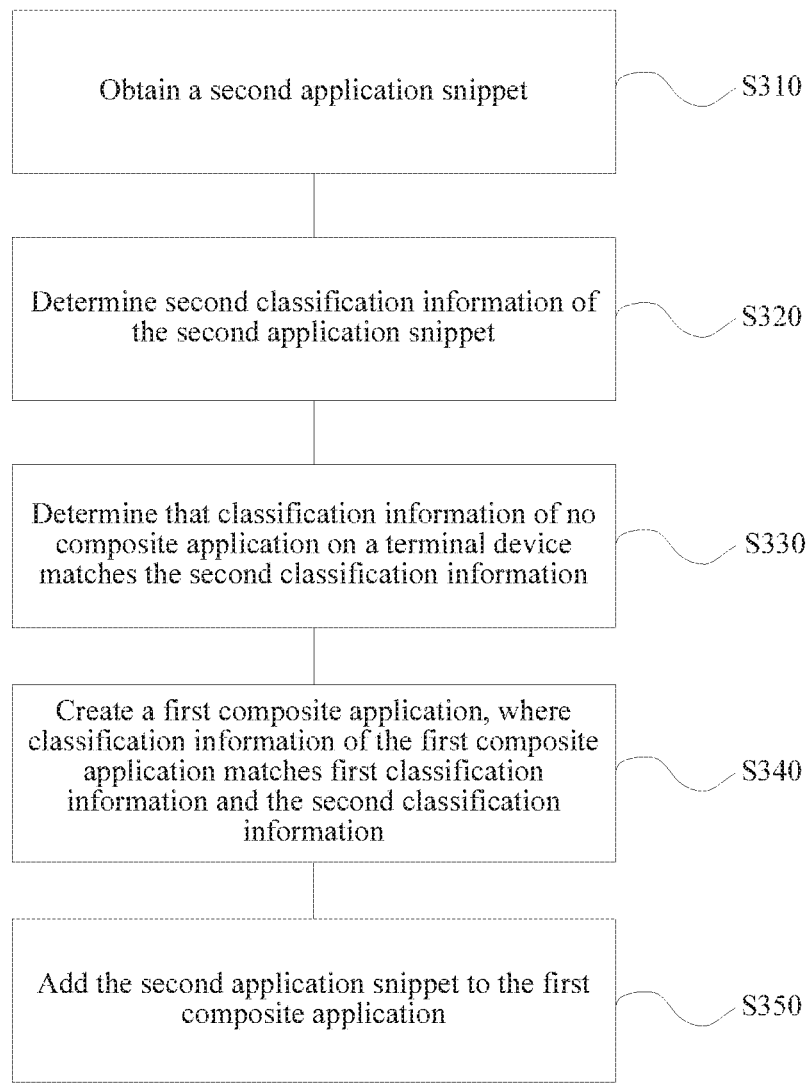
FIG. 6 is another schematic flowchart of a method for managing an application snippet according to an embodiment of this application.

FIG. 6 is a schematic flowchart of a method 300 for managing an application snippet according to an embodiment of this application. As shown in FIG. 6, the method 300 may be performed by a terminal device (for example, the mobile phone 100), and the method 300 includes the following steps.

S310. Obtain a second application snippet.

It should be understood that, the terminal device may obtain the second application snippet before obtaining the first application snippet in S210. The first application snippet and the second application snippet are different application snippets, or may be a same application snippet. An obtaining process is the same as an application process of the foregoing first application snippet. For brevity, details are not described herein again.

S320. Determine second classification information of the second application snippet.

It should be understood that, a process of determining the second classification information of the second application snippet by the terminal device is the same as the foregoing process of determining the first classification information. For brevity, details are not described herein again.

S330. Determine that classification information of no composite application on the terminal device matches the second classification information.

Specifically, the terminal device may have a plurality of composite applications, and each composite application has respective classification information. The terminal device may perform matching between the classification information of the plurality of composite applications and the second classification information, to determine that the classification information of the plurality of composite applications does not match the second classification information.

For example, the terminal device is the mobile phone 100. After processing the first classification information, the processor 130 of the mobile phone 100 may further determine the classification information of the plurality of composite applications in the mobile phone 100, and the processor 130 performs matching between the classification information of the plurality of composite applications and the second classification information, to determine that the classification information of the plurality of composite applications does not match the second classification information.

S340. Create a first composite application, where classification information of the first composite application matches the first classification information and the second classification information.

Specifically, after the terminal device determines that the classification information of the plurality of composite applications does not match the second classification information, the terminal device creates the first composite application, where the classification information of the first composite application matches the first classification information and the second classification information. After obtaining the first application snippet, the terminal device may add the first application snippet to the first composite application.

For example, when the terminal device is a mobile phone 100, after the processor 130 of the mobile phone 100 determines that classification information of no composite application in the mobile phone 100 matches the second classification information, the processor 130 creates the first composite application. After obtaining the first application snippet by using the RF circuit 110, the Wi-Fi module 190, or the Bluetooth module 183, the mobile phone 100 sends the first application snippet to the processor 130. After determining the first classification information of the first application snippet, the processor 130 determines that the classification information of the first composite application matches the first classification information, so that the processor 130 determines to add the first application snippet to the first composite application.

S350. Add the second application snippet to the first composite application.

It should be understood that, a process of adding the second application snippet to the first composite application by the terminal device is the same as the process of adding the first application snippet to the first composite application. For brevity, details are not described herein again.

It should further be understood that, the method 300 for managing an application snippet may be performed before the method 200.

According to the method for managing an application snippet provided in this embodiment of this application, a large quantity of application snippets can be effectively managed. This helps a user reduce difficulty in using a same application snippet again, and is beneficial to improvement of distribution efficiency of the application snippet.

Figure 7:
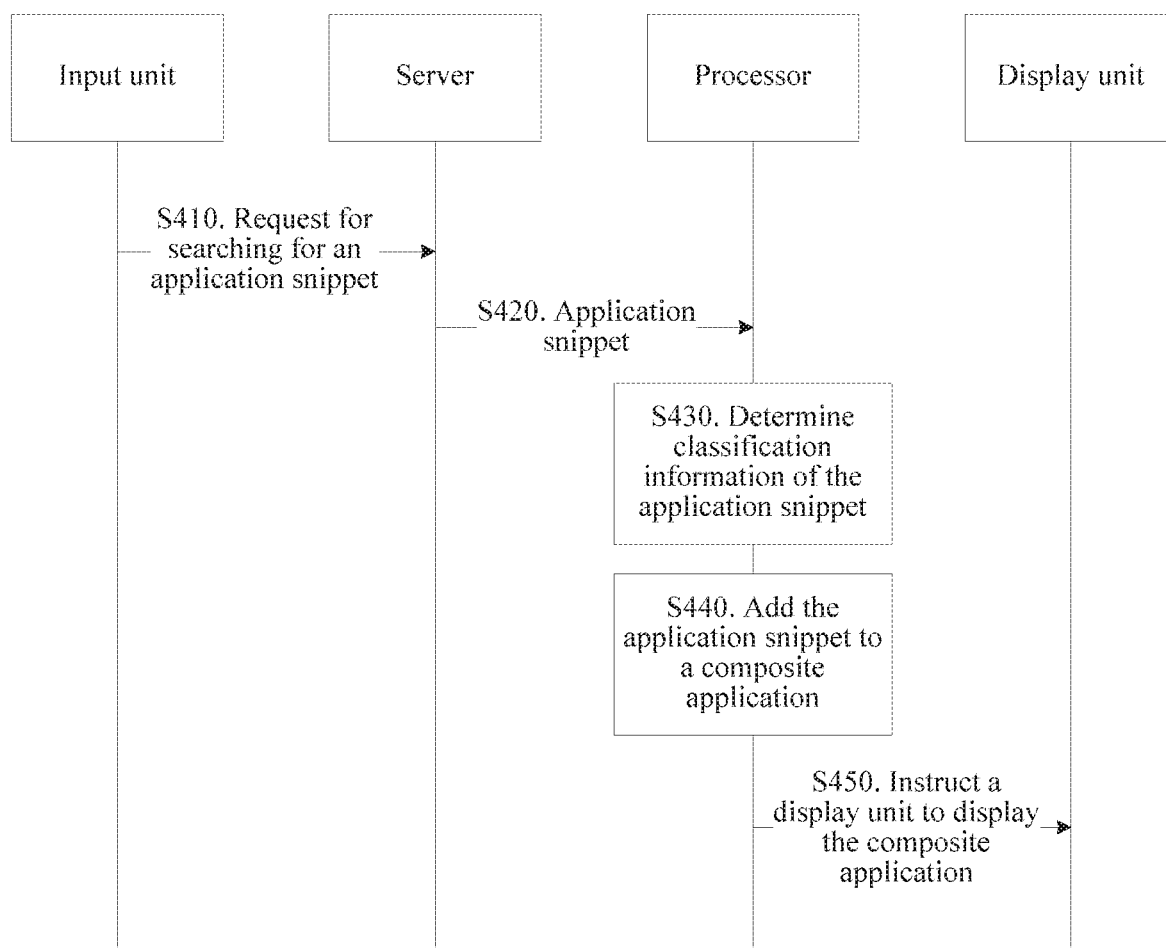
FIG. 7 is still another schematic flowchart of a method for managing an application snippet according to an embodiment of this application.

FIG. 7 is a schematic flowchart of a method 400 for managing an application snippet according to an embodiment of this application. As shown in FIG. 7, the method 400 includes the following steps.

S410. A user sends, to a server by using an input unit, a request for searching for an application snippet.

Specifically, content entered by the user by using the input unit of a terminal device (for example, the input unit 150 of the mobile phone 100) may have a plurality of forms, for example, a keyword or a sentence. There may be a plurality of types of input media, for example, text, voice, and image. The input unit may be implemented in various forms. For example, a touchpad can receive an entered word, a microphone can receive a voice input, and a camera can receive an image input.

It should be understood that, the user not only can search for the application snippet by using the server, but also cart obtain the application snippet through native search on the terminal device. This application is not limited thereto.

S420. The server sends the application snippet to a processor of a terminal device.

Specifically, after receiving the search request, the terminal device finds the matched application snippet and returns the application snippet to the processor of the terminal device.

S430. The processor of the terminal device determines classification information of the application snippet.

Specifically, the processor of the terminal device obtains an application snippet release package, and obtains a function classification attribute through decomposition according to a constitutive rule of the application snippet release package. For example, a group of tags or a paragraph of function description is obtained. The obtained function classification attribute is further processed, to determine the classification information of the application snippet. For example, an application snippet is provided with a plurality of tags, and one of the tags is selected; or an application snippet is provided with a paragraph of text description, word segmentation and syntax analysis are performed, to extract a word that is used to describe a function.

Optionally, before the step is performed, it can be determined whether the user has executed the application snippet, that is, if the user does not execute the application snippet, it is considered that the application snippet is unimportant and does not need to be stored on the intelligent terminal, and therefore the step and a subsequent step of generating a composite application do not need to be performed.

S440. The processor of the terminal device adds the application snippet to a composite application.

Specifically, the processor of the terminal device searches a classification of an existing composite application for a composite application of a same type based on a function classification extracted in the foregoing step. If there is a composite application of a same classification, the application snippet is added to the composite application; or if there is no composite application of a same classification, a new composite application is generated. To generate a new composite application or add the application snippet to an existed composite application is to establish an association relationship between the application snippet and the composite application.

Figure 8:
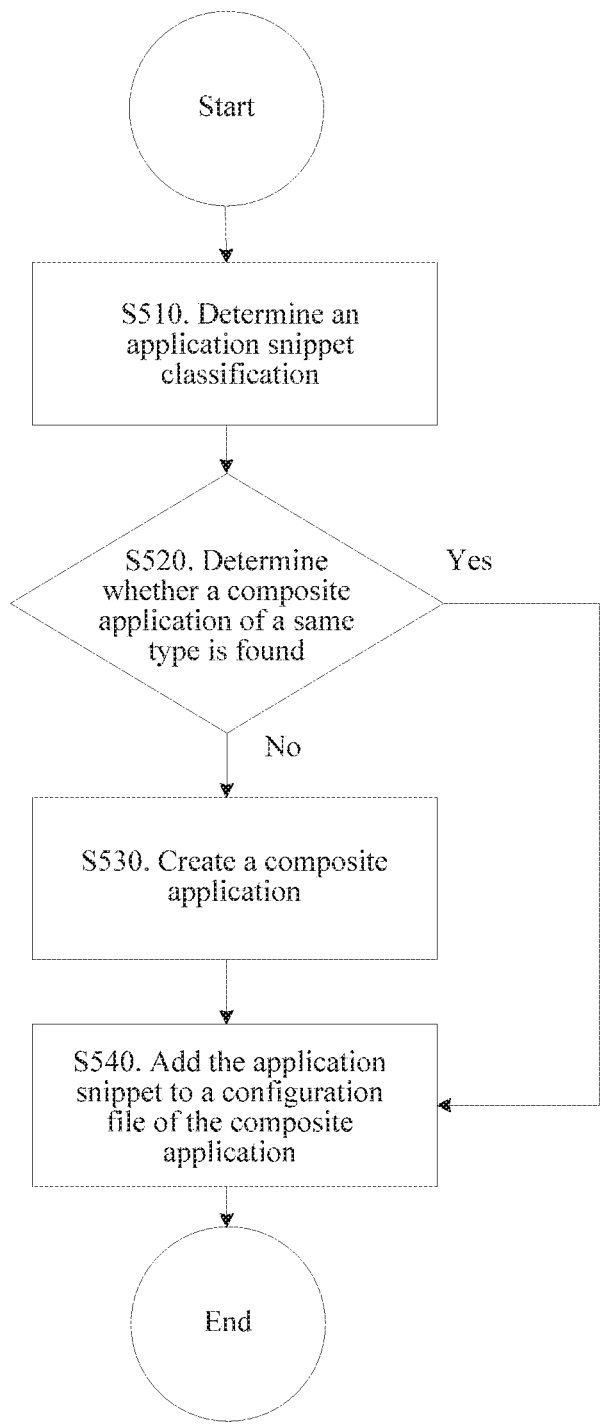
FIG. 8 is still another schematic flowchart of a method for managing an application snippet according to an embodiment of this application.

FIG. 8 is a schematic flowchart of a method 500 in which an application snippet is added to a composite application. As shown in FIG. 8, the method 500 is executed by a processor of the terminal device (such as the processor 130 of the mobile phone 100), and the method 500 includes the following steps.

S510. The processor obtains classification information of the application snippet.

S520. A composite application management module determines whether a matched composite application can be found.

Specifically, a configuration file managed by the composite application management module includes classification information of the composite application, and the classification information is compared with classification information of the application snippet. If the two pieces of classification information are the same or are similar, it is considered that a composite application of the classification has been created; or if the two pieces of classification information do not match each other, it is considered that a composite application of the classification has not been created yet.

It should be understood that, the composite application management module may be a part of the processor.

S530. The processor creates a configuration file of the composite application.

Specifically, when determining that no configuration file has been created, the processor generates a new configuration file. Necessary information, such as a composite application icon, a composite application name, and a composite application classification, in the configuration file is determined. In addition, the icon is placed on a desktop of the terminal device, and an association relationship between the icon on the desktop and the configuration file of the composite application is established by invoking a function of an operating system.

S540. The processor adds information about the application snippet to the configuration file.

Specifically, that the information about the application snippet is added to the configuration file indicates that a navigation process from the composite application icon to the application snippet program has been established.

S450. Display the composite application in a display module.

Figure 9:
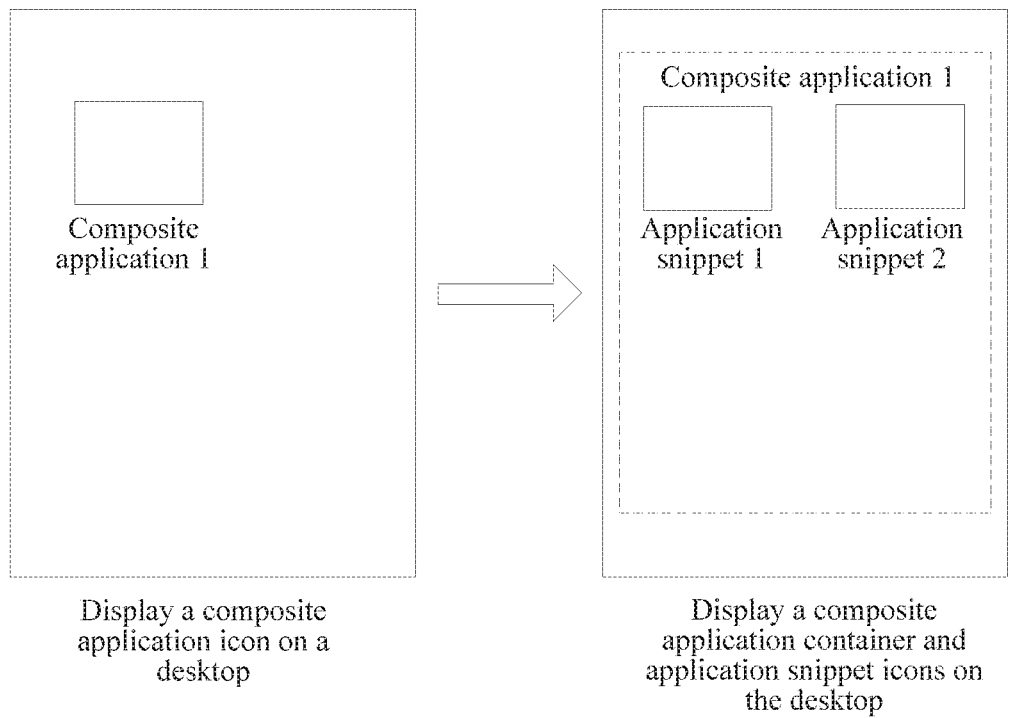
FIG. 9 is a schematic diagram of displaying a composite application icon on a desktop according to an embodiment of this application.

Specifically, after the composite application is successfully established, a new icon is added to the desktop. FIG. 9 is a schematic diagram of displaying a composite application icon on a desktop. As shown in FIG. 9, after the icon is clicked, a container of the composite application is displayed in dashed lines, and icons of application snippets included in the container are further displayed.

For example, when the terminal device is the mobile phone 100, after the composite application is successfully created by the processor 130, a new icon is added to the desktop of the mobile phone 100, and the composite application is displayed in the display unit 160.

Optionally, the container represented by using the dashed lines may not be displayed on the interface.

It should be understood that, the method for managing an application snippet in this embodiment of this application further includes an application snippet update mechanism, to be specific, an application snippet that meets a specific condition is automatically deleted from a composite application. For example, a time period may be set on the terminal device. If an application snippet saved in the time period is not started or used again, the application snippet is automatically deleted from the composite application.

According to the method for managing an application snippet in this embodiment of this application, application snippets of a same classification are grouped based on classification information, so that the application snippet can be smoothly found by the user next time without needing to be obtained from the server every time, thereby reducing traffic used in a search process and for downloading.

Each user has a different requirement, and different composite applications are formed through long-time accumulation, so that a personalization degree of the terminal device is higher.

The method for managing an application snippet according to this embodiment of this application is described in detail above with reference to FIG. 3 to FIG. 9, and the terminal device according to this embodiment of this application is described in detail below. A technical feature described in the method embodiment is also applicable to the following apparatus embodiment.

An embodiment of this application provides a terminal device for managing an application snippet. The terminal device may correspond to the mobile phone 100 in FIG. 2. For ease of description of this embodiment of this application, the mobile phone 100 is used as an example of the terminal device to describe this embodiment of this application.

The terminal device includes a communications interface and a processor.

The communications interface is configured to obtain a first application snippet.

The processor is configured to determine first classification information of the first application snippet.

The processor is further configured to determine that classification information of a first composite application on the terminal device matches the first classification information.

The processor is further configured to add the first application snippet to the first composite application.

Specifically, as shown in FIG. 1, the communications interface may correspond to the Wi-Fi module 190, the RF circuit 110, or the Bluetooth module 183 configured in the mobile phone 100 in FIG. 1, and the processor may correspond to the processor 130 in the mobile phone 100.

It should be understood that, the "communications interface" represents a device configured to obtain an application snippet, and may alternatively be described as another device, for example, an "obtaining device" or a "communications device". This application is not limited thereto.

Specifically, the mobile phone 100 may obtain a first application snippet by using the communications interface, so that the processor 130 processes the first application snippet, determines first classification information of the first application snippet, and determines that classification information of a first composite application on the terminal device matches the first classification information. Finally, the processor 130 adds the first application snippet to the first composite application.

Optionally, the communications interface is further configured to obtain a second application snippet.

The processor is further configured to determine second classification information of the second application snippet.

The processor is further configured to determine that classification information of no composite application on the terminal device matches the second classification information.

The processor is further configured to create the first composite application, where the classification information of the first composite application matches the first classification information and the second classification information.

The processing module is further configured to add the second application snippet to the first composite application.

Specifically, before obtaining the first application snippet, the mobile phone 100 obtains a second application snippet by using the communications interface. The processor 130 processes the second application snippet, determines second classification information of the second application snippet, and determines that classification information of no composite application on the terminal device matches the second classification information. The processor 130 creates the first composite application, where the first composite application matches the first classification information and the second classification information. Finally, the processor 130 adds the second application snippet to the first composite application.

Optionally, the first composite application includes a configuration file. The processor is specifically configured to add description information of the first application snippet to the configuration file of the first composite application, to establish an association relationship between the first application snippet and the first composite application, where the association relationship is an access navigation path from the first composite application to the first application snippet.

Optionally, the description information includes at least one of a name of the first application snippet, an executable code access path of the first application snippet, and an icon of the first application snippet.

Optionally, the processor is further configured to determine that a user has executed the first application snippet.

Optionally, the communications interface is specifically configured to:
obtain the first application snippet sent by a server; or
obtain the first application snippet obtained by the user through native search.

The terminal device in this embodiment of this application can effectively manage a large quantity of application snippets. This helps a user reduce difficulty in using a same application snippet again, and is beneficial to improvement of distribution efficiency of the application snippet.

The terminal device groups application snippets of a same classification based on classification information, so that the application snippet can be smoothly found by the user next time without needing to be obtained from the server every time, thereby reducing traffic used in a search process and for downloading. Each user has a different requirement, and different composite applications are formed through long-time accumulation, so that a personalization degree of the terminal device is higher.

An embodiment of this application further provides a terminal device for managing an application snippet. The terminal device includes a communications module and a processing module.

The communications module is configured to obtain a first application snippet.

The processing module is configured to determine first classification information of the first application snippet.

The processing module is further configured to determine that classification information of a first composite application on the terminal device matches the first classification information.

The processing module is further configured to add the first application snippet to the first composite application.

It should be understood that, the communications module may correspond to the Wi-Fi module 190, the RF circuit 110, or the Bluetooth module 183 configured in the mobile phone 100 in FIG. 2, and the processing module may correspond to the processor 130 in the mobile phone 100.

Specifically, the mobile phone 100 may obtain a first application snippet by using a communications interface, so that the processor 130 processes the first application snippet, determines first classification information of the first application snippet, and determines that classification information of a first composite application on the terminal device matches the first classification information. Finally, the processor 130 adds the first application snippet to the first composite application.

It should be understood that, the communications module may correspond to the foregoing communications interface, and the processing module may correspond to the foregoing processor. For brevity, details are not described herein again.

Optionally, the communications module is further configured to obtain a second application snippet.

The processing module is further configured to determine second classification information of the second application snippet.

The processing module is further configured to determine that classification information of no composite application on the terminal device matches the second classification information.

The processing module is further configured to create the first composite application, where the classification information of the first composite application matches the first classification information and the second classification information.

The processing module is further configured to add the second application snippet to the first composite application.

Optionally, the first composite application includes a configuration file. The processing module is specifically configured to add description information of the first application snippet to the configuration file of the first composite application, to establish an association relationship between the first application snippet and the first composite application, where the association relationship is an access navigation path from the first composite application to the first application snippet.

Optionally, the description information includes at least one of a name f the first application snippet, an executable code access path of the first application snippet, and an icon of the first application snippet.

Optionally, the processing module is further configured to determine that a user has executed the first application snippet.

Optionally, the obtaining module is specifically configured to: obtain the first application snippet sent by a server; or obtain the first application snippet obtained by the user through native search.

The terminal device in this embodiment of this application can effectively manage a large quantity of application snippets. This helps a user reduce difficulty in using a same application snippet again, and is beneficial to improvement of distribution efficiency of the application snippet.

The terminal device groups application snippets of a same classification based on classification information, so that the application snippet can be smoothly-found by the user next time without needing to be obtained from the server every time, thereby reducing traffic used in a search process and for downloading. Each user has a different requirement, and different composite applications are formed through long-time accumulation, so that a personalization degree of the terminal device is higher.

An embodiment of this application further provides a computer program product, where when the computer program product is run on a computer, the computer is enabled to perform the foregoing method for managing an application snippet.

It should be understood that the computer program product may be software, or another type of computer program product. This application is not limited thereto.

In this embodiment of this application, the processor may be a central processing unit (central processing unit, CPU), a network processor (network processor, NP), or a combination of a CPU and an NP. The processor may further include a hardware chip. The foregoing hardware chip may be an application-specific integrated circuit (Application-Specific Integrated Circuit, ASIC), a programmable logic device (Programmable Logic Device, PLD), or a combination thereof. The PLD may be a complex programmable logical device (CPLD), a field-programmable gate array (Field-Programmable Gate Array, FPGA), generic array logic (Generic Array Logic, GAL), or a combination thereof.

The memory may be a volatile memory or a non-volatile memory, or may include a volatile memory and a non-volatile memory. The non-volatile memory may be a read-only memory (Read-Only Memory, ROM), a programmable read-only memory (Programmable ROM, PROM), an erasable programmable read-only memory (Erasable PROM, EPROM), an electrically erasable programmable read-only memory (Electrically EPROM, EEPROM), or a flash memory. The volatile memory may be a random access memory (Random Access Memory, RAM), used as an external cache.

All or some of the foregoing embodiments may be implemented by using software, hardware, firmware, or any combination thereof. When software is used to implement the embodiments, the embodiments may be implemented completely or partially in a form of a computer program product. The computer program product may include one or more computer instructions. When the computer program instructions are loaded and executed on the computer, the procedure or functions according to the embodiments of this application are all or partially generated. The computer may be a general purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a soft disk, a hard disk, or a magnetic disk), an optical medium (for example, a DVD), a semiconductor medium (for example, a solid state disk (Solid State Disk, SSD)), or the like.

A person of ordinary skill in the art may be aware that, the units and algorithm steps in the examples described with reference to the embodiments disclosed in this specification may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working, process of the system, apparatus, and unit, refer to a corresponding process in the method embodiments. Details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units may be integrated into one unit.

When the functions are implemented in a form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of this application. The foregoing storage medium includes: any medium that can store program code, such as a flash drive, a removable hard disk, a read-only memory, a random access memory, a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method, comprising:
    obtaining a first application snippet, wherein the first application snippet is a segment of a native application running on a terminal device, and wherein the first application snippet comprises service logic for implementing a function;
    determining first classification information of the first application snippet;
    determining that second classification information of a first composite application on the terminal device matches the first classification information, wherein the first composite application comprises a container and a configuration file and does not comprise any service logic; and
    adding the first application snippet to the container of the first composite application according to the configuration file in response to the second classification information of the first composite application matching the first classification information.

2. The method of claim 1, wherein before obtaining the first application snippet, the method further comprises:
    obtaining a second application snippet;
    determining third classification information of the second application snippet;
    determining that the third classification information fails to match fourth classification of a second composite application on the terminal device;
    creating the first composite application, wherein the second classification information of the first composite application matches the third classification information; and
    adding the second application snippet to the container of the first composite application.

3. The method of claim 1, wherein adding the first application snippet to the container of the first composite application comprises adding description information of the first application snippet to the configuration file of the first composite application to establish an association relationship between the first application snippet and the first composite application, and wherein the association relationship is an access navigation path from the first composite application to the first application snippet.

4. The method of claim 3, wherein the description information comprises at least one of a name of the first application snippet, an executable code access path of the first application snippet, or an icon of the first application snippet.

5. The method of claim 1, wherein before determining the first classification information of the first application snippet, the method further comprises determining that the first application snippet has been executed.

6. The method of claim 1, wherein obtaining the first application snippet comprises receiving the first application snippet from a server.

7. A terminal device, comprising:
    a memory configured to store instructions; and
    a processor coupled to the memory and configured to execute the instructions to cause the terminal device to:
        receive a first application snippet, wherein the first application snippet is a segment of a native application running on the terminal device, and wherein the first application snippet comprises service logic for implementing a function;
        determine first classification information of the first application snippet;
        determine that second classification information of a first composite application on the terminal device matches the first classification information, wherein the first composite application comprises a container and a configuration file and does not comprise any service logic; and
        add the first application snippet to the container of the first composite application according to the configuration file in response to the second classification information of the first composite application matching the first classification information.

8. The terminal device of claim 7, wherein the processor is further configured to execute the instructions to cause the terminal device to:
    receive a second application snippet;
    determine third classification information of the second application snippet;
    determine that the third classification information fails to match fourth classification of another composite application on the terminal device;
    create the first composite application, wherein the second classification information of the first composite application matches the third classification information; and
    add the second application snippet to the container of the first composite application.

9. The terminal device of claim 7, wherein the processor is further configured to add description information of the first application snippet to the configuration file of the first composite application to establish an association relationship between the first application snippet and the first composite application, and wherein the association relationship is an access navigation path from the first composite application to the first application snippet.

10. The terminal device of claim 9, wherein the description information comprises at least one of a name of the first application snippet, an executable code access path of the first application snippet, and an icon of the first application snippet.

11. The terminal device of claim 7, wherein the processor is further configured to determine that the first application snippet has been executed.

12. The terminal device of claim 7, wherein the first application snippet is received from a server.

13. A computer program product comprising instructions stored on a non-transitory computer-readable medium that, when executed by a processor, cause a terminal device to:
    obtain a first application snippet, wherein the first application snippet is a segment of a native application running on the terminal device, and wherein the first application snippet comprises service logic for implementing a function;
    determine first classification information of the first application snippet;
    determine that second classification information of a first composite application on the terminal device matches the first classification information, wherein the first composite application comprises a container and a configuration file and does not comprise any service logic; and add the first application snippet to the container of the first composite application according to the configuration file in response to the second classification information of the first composite application matching the first classification information.

14. The computer program product of claim 13, wherein the instructions further cause the terminal device to:

obtain a second application snippet;

determine third classification information of the second application snippet;

determine that the third classification information fails to match fourth classification of another composite application on the terminal device;

create the first composite application, wherein the second classification information of the first composite application matches the first classification information and the third classification information; and add the second application snippet to the container of the first composite application.

15. A method, comprising:

obtaining a first application snippet, wherein the first application snippet is a segment of a native application running on a terminal device, and wherein the first application snippet comprises service logic for implementing a function;

obtaining first classification information of the first application snippet;

adding the first application snippet to a container of a first composite application according to a configuration file of the first composite application in response to second classification information of the first composite application matching the first classification information, wherein the second classification information of the first composite application matches the first classification information, and wherein the first composite application comprises the container and the configuration file and does not comprise any service logic; and creating the first composite application in response to the first classification information failing to match the second classification information of the first composite application on the terminal device.

16. The method of claim 15, wherein adding the first application snippet to the container of the first composite application comprises adding description information of the first application snippet to the configuration file of the first composite application to establish an association relationship between the first application snippet and the first composite application, and wherein the association relationship is an access navigation path from the first composite application to the first application snippet.

17. The method of claim 16, wherein the description information comprises at least one of a name of the first application snippet, an executable code access path of the first application snippet, or an icon of the first application snippet.

18. The method of claim 15, wherein obtaining the first application snippet comprises receiving the first application snippet from a server.

19. A terminal device, comprising:

a memory configured to store instructions; and a processor coupled to the memory and configured to execute the instructions to cause the terminal device to:

obtain a first application snippet, wherein the first application snippet is a segment of a native application running on the terminal device, and wherein the first application snippet comprises service logic for implementing a function;

obtain first classification information of the first application snippet;

add the first application snippet to a container of a first composite application according to a configuration file of the first composite application in response to second classification information of the first composite application matching the first classification information, wherein the second classification information of the first composite application matches the first classification information, and wherein the first composite application comprises the container and the configuration file and does not comprise any service logic; and create the first composite application in response to the first classification information failing to match the second classification information of the first composite application on the terminal device.

20. The terminal device of claim 19, wherein the processor is configured to execute the instructions to cause the terminal device to add the first application snippet to the container of the first composite application by adding description information of the first application snippet to the configuration file of the first composite application to establish an association relationship between the first application snippet and the first composite application, and wherein the association relationship is an access navigation path from the first composite application to the first application snippet.

* * * * *